3,398,506
PURIFICATION OF GASES
Wolfgang Baldus, Munich, Germany, assignor to Gesellschaft fur Linde's Eismaschinen Aktiengesellschaft, Wiesbaden, Germany
Filed June 7, 1965, Ser. No. 461,860
Claims priority, application Germany, June 5, 1964, G 40,769
20 Claims. (Cl. 55—23)

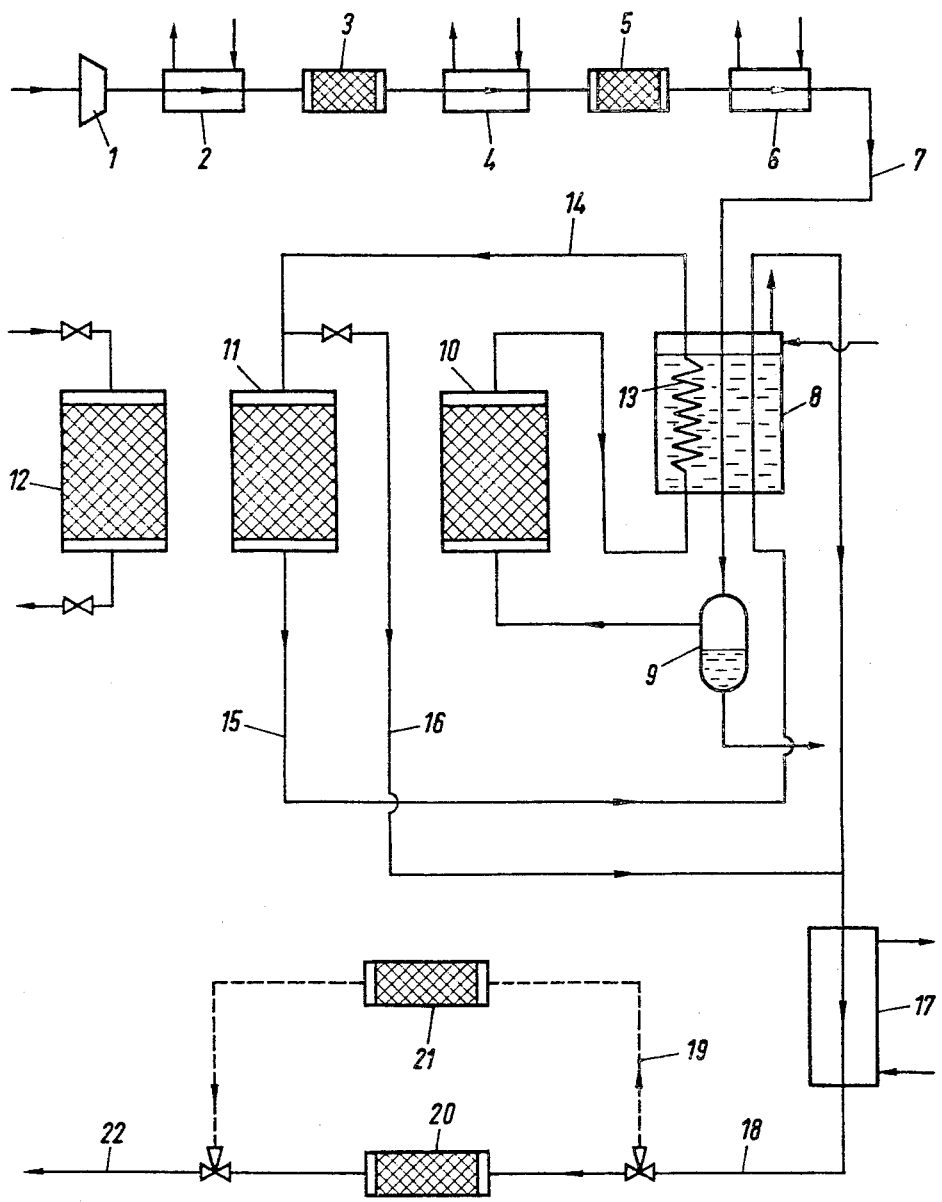

ABSTRACT OF THE DISCLOSURE

In a process for the production of hydrogen containing at least 1 adsorbable impurity selected from the group consisting of nitrogen, methane, carbon monoxide, and a mixture thereof, comprising compressing raw hydrogen, cooling resultant compressed hydrogen to condense substantially all impurities boiling above −120° C. in said compressed hydrogen, and passing resultant condensate-free hydrogen through an adsorption zone to eliminate said adsorbable impurity, the improvement in the adsorption step which comprises passing said hydrogen containing said adsorbable impurity through a first adsorber zone operating at 90° K. to remove a portion of said adsorbable impurity; then passing resultant purified gas to a second adsorber zone operating at 35-45° K. to remove a further amount of said adsorbable impurity; and withdrawing finally purified gas from said second adsorber zone.

This invention relates to a process for the purification of gases, in particular to a process for obtaining cryogenic gases of high purity from raw gases wherein impurities remaining in compressed raw gas after a condensation process are eliminated by adsorption.

There are several processes for eliminating undesired impurities from gases. It is known, for example, to separate the undesired components by adsorption with solvents. It is also known to employ regenerators for eliminating such impurities, the gaseous mixture being cooled below the dew point of the impurity to be removed; the impure component then condenses on the cold regenerator mass. Particularly widely used are adsorption agents, which can be used for a wide variety of purification purposes and have the advantage of being capable of decreasing the concentration of impurities to a very low level.

In the latter process, an attempt is generally made to separate in one single process step one or more undesired impurities until the required final purity of the gaseous mixture with respect to these impurities is achieved. Conventionally, one or more pairs of switching adsorbers are employed; when more than one pair is employed, the on-stream adsorbers are serially connected. This type of operation, however, has the disadvantage that the adsorbers must be regenerated as completely as possible in order to ensure a high purity of the final product.

As known, a thorough regeneration requires a heating of the adsorbers to a temperature which is substantially above the adsorption temperature. If the adsorber must have very large dimensions, as is necessary in case of either poorly adsorbable, or large quantities of, impurities, the refrigeration energy required for re-cooling the regenerated adsorbers places a heavy load on the refrigerating plant. This fact leads to high direct operating expenses, as well as heavy expenditures for equipment.

A principal object of the present invention, therefore, is to provide an improved process which assures a high final purity of the gas to be purified, with a simultaneous decrease in the costs for adsorber regeneration.

Upon further study of the specification and claims, other objects and advantages of the present invention will become apparent.

To attain the objects of this invention, there is provided a process for the low-temperature purification of gases which comprises passing gas containing an adsorbable impurity, this adsorbable impurity having a normal boiling point below −120° C., through a first adsorber zone operating at a first temperature to remove a proportion of the adsorbable impurity, and then passing resultant partially purified gas to a second adsorber zone operating at a second temperature to remove a further amount of the adsorbable impurity, the second adsorber zone operating at a temperature lower than said first temperature.

The attached drawing represents a schematic flowsheet of a comprehensive embodiment of this invention.

A preferred embodiment of the invention comprises freeing the raw gas, after high boiling impurities have been eliminated, in a first adsorption zone containing at least two adsorbers which can be switched successively to adsorption, regeneration, and cooling, from the larger quantity of the lower boiling impurities and only subsequently freeing the raw gas in a second adsorption zone having at least one adsorber, from remaining amounts of the lower boiling impurities.

The process of the invention is particularly suitable for purifying low-boiling gases, i.e., gases having a normal boiling point less than −230° C., such as, for example, helium, hydrogen, or neon. For particular uses of these gases, high requirements have to be met with respect to the purity of the final product, for example when helium is to be used in reactor-cooling gas cycles, or when hydrogen is to be used in the field of rockets.

The process of the invention operates in such a manner that the impurities contained in the low-boiling gas are eliminated in several stages. In this connection, it is recommended to quantitatively eliminate beforehand higher boiling impurities, such as, for example $H_2O$ or $CO_2$, in a special adsorber or in an adsorber series; this does not pose any particular difficulties. In the same manner, higher boiling impurities can also be congealed and thus separated in regenerators or in heat exchangers, or they can be removed by means of any desired combination of these methods.

The removal of the lower boiling impurities, i.e., those having a normal boiling point below −120° C., preferably below −155° C., such as, for example, $N_2$, CO, and $CH_4$, is conducted in two stages. These low-boiling impurities are only partially eliminated in the first stage, while the complete removal of these impurities takes place in the second adsorption zone. This manner of carrying out the process has the decisive advantage that the second adsorption stage is burdened only with a relatively small amount of the impurities, whereby, on the one hand, an especially high final purity of the low-boiling gas leaving the second adsorption stage is assured, and on the other hand, the operating adsorber in the second adsorption stage can be maintained on stream for a long duration without requiring regeneration. Concomitant with the latter is the further advantage that the adsorbers of the second adsorption stage can either be small in size or, with bigger adsorbers, the regenerating costs of this stage can be kept even lower, because the necessity of switching the adsorbers will arise only rarely.

According to a further preferred embodiment of this invention, the regeneration of the adsorbers is conducted in the first adsorption stage at a temperature which is not more than about 130° C., preferably not more than 90° C. above the adsorption temperature. Necessarily, the heat applied to an adsorber during regeneration must be removed again from the adsorber when it is switched to adsorption operation. The expenditure involved is the larger, the greater the temperature difference is between the regeneration and the adsorption stages, i.e., more heat must be removed from the adsorber in order to bring it down to the low adsorption temperature. This expenditure is substantial in conventional adsorber systems which in one adsorption temperature stage are designed to completely eliminate one or several components from a gaseous mixture and which consequently must again be completely regenerated, that is, be heated to a substantially higher temperature.

In accordance with still another preferred embodiment of this invention, the regeneration is controlled, in the first adsorption zone formed of two or more switchable adsorbers, in such a manner that the adsorbers are not completely regenerated but that a residual charge of $N_2$, CO and $CH_4$ remains thereon. This residual charge is then controlling with respect to the concentration of impurities in the resultant gas leaving this adsorption stage. In order to avoid disadvantages which could result from this residual charge of the adsorbers with respect to the subsequent parts of the apparatus, the preferred process is conducted so that the residual charge which, in the final analysis, is dependent upon the temperature difference between the adsorption and the regeneration, is maintained at a sufficiently low concentration so as to avoid congealing of the remaining impurities in colder parts of the apparatus located in between the first and second adsorption stages, thereby preventing fouling of pipelines, valves, heat exchangers, etc. This preferred concentration of impurities leaving the first adsorption stage is about 50 to 500 preferably about 50 to 150 p.p.m.

Normally, three switchable adsorbers are employed in the first adsorption stage. However, if the steps of regenerating and cooling one of the adsorbers are accelerated so that they can be finished during the adsorption process which occurs in the other adsorber, two adsorbers will be sufficient.

The substantially complete removal of these lower boiling impurities contained in the gas, i.e., lower than 5 p.p.m., preferably lower than 0.5 p.p.m., is then conducted in the second adsorption stage. In general, the operating temperature of the second adsorption stage is at least 25° C., preferably 50° C. lower than the first adsorption stage.

This second adsorption stage can, if desired, consist of only a single adsorber in place of two switchable adsorbers. During the regeneration of such a single adsorber, it is not in every case necessary to switch off the entire plant, but it is possible to merely bypass it. If, by bypassing the adsorber, the residual impurities congeal in the parts of the apparatus located after the adsorber, this may be considered the lesser of two evils under certain circumstances when considering the small quantities and long switching times, particularly as with this procedure a substantial simplification of the apparatus is accomplished.

Various types of adsorbents can be employed in the adsorbers, as known by those skilled in this technology, depending on the gas to be purified and the impurities to be eliminated. For example, there can be used silica gel, alumina gel, molecular sieves, or active charcoal.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

Referring now to the drawing, it will be described in detail with reference to a process for the purification of hydrogen. In compressor 1, raw hydrogen contaminated with small quantities of nitrogen, carbon monoxide and methane, i.e., about 0.5 to 1 percent by volume of each, and traces of carbon dioxide and water, i.e., not more than 10 p.p.m. $CO_2$ and having an $H_2O$-dew point of $-50°$ C., is compressed to a pressure of about 10 atmospheres absolute and cooled, in heat exchangers 2, 4 and 6 to a temperature of below 100° K., preferably about 90° K. The cooling process in the three heat exchangers is regulated such that, when passing through the adsorber 3, the dew point of the water is reached and, when passing through the adsorber 5, the dew point of the carbon dioxide is reached so that these two components can be quantitatively separated in the adsorbers.

The thus pre-purified raw hydrogen is then conducted via line 7 to a nitrogen refrigerating bath 8 charged with liquefied nitrogen at its boiling point, for example, at a temperature of 90° K. This nitrogen bath dissipates heat from the entering raw hydrogen by the evaporation of liquid nitrogen, and moreover assures a constant exit temperature for the cooled hydrogen gas leaving the coiled pipes or bundles of pipes in the bath. By this nitrogen bath, the temperature of the raw hydrogen is cooled to about 90° K., and at this temperature, the larger portion of the methane contained in the raw hydrogen separates in liquid form, this liquid methane being collected in the separator 9. The raw hydrogen then enters the adsorber 10.

The adsorbers 10, 11 and 12 are interchangeably switchable adsorbers containing silica gel as the adsorbent; in the phase illustrated in the drawing, the adsorber 10 is switched to adsorption, the adsorber 11 to cooling, and the adsorber 12 to regeneration. The raw hydrogen entering adsorber 10 contains, for example, 2% in total of nitrogen, methane, and carbon monoxide. The hydrogen leaves the adsorber 10 with a content of, for example, 100 p.p.m. in total of nitrogen, methane, and carbon monoxide. The thus pre-purified hydrogen dissipates the heat of adsorption to the nitrogen bath 8 via the coiled pipe 13. A portion is conducted via line 14 to adsorber 11 which was regenerated in the preceding switching period, and cools this adsorber to adsorption temperature. The heated hydrogen which passes through line 15 is again cooled, in nitrogen bath 8, to a temperature of about 90° K., is combined with the cold hydrogen conducted through line 16, and is cooled, in heat exchanger 17, to a temperature of 35 to 45° K. The cold hydrogen enters one of the two interchangeably switchable adsorbers 20 and 21, containing silica gel as the adsorbent, via one of the two lines 18 or 19, and is there freed from the above-mentioned impurities, leaving a residual concentration of, for example, up to 0.5 p.p.m. in total. The high purity hydrogen can be removed via line 22.

The adsorber 12 is regenerated, for example, by flushing with a warm scavenging gas, e.g., purified gas. The regeneration temperature is maintained in the range of about 180 to 220° K., and at this temperature, the adsorber is not completely regenerated but retains a certain residual charge of impurities. The refrigerating energy required for cooling the adsorber down to operating temperature is, however, substantially below the value required for a complete regeneration involving a heating-up temperature of, for example, 400° K.

The preceding examples can be repeated with similar success by substituting the generically and specifically described reactants and operating conditions of this invention for those used in the preceding examples.

From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the low-temperature purification of gas having been cooled down to at least about $-120°$ C., said gas being substantially devoid of impurities normally boiling above −120° C., but containing an adsorbable impurity having a normal boiling point below −120° C., said process comprising passing said gas through a first adsorber zone operating at a first temperature less than the critical temperature of nitrogen to remove a proportion of said adsorbable impurity; then cooling resultant partially purified gas; passing resultant cooled partially purified gas to a second adsorber zone operating at a second temperature to remove a further amount of said adsorbable impurity, said second adsorber zone operating at a temperature lower than said first temperature; and withdrawing finally purified gas from said second adsorber zone for ultimate use as a purified gas.

2. A process as defined by claim 1 wherein said second temperature is at least 25° C. lower than said first temperature.

3. A process as defined by claim 1 wherein said gas is hydrogen; said adsorbable impurity is nitrogen, methane, carbon monoxide, or a mixture thereof; and the adsorption is conducted under substantial superatmospheric pressure.

4. A process as defined by claim 1, further comprising the step of regenerating adsorbent in said first adsorber zone at a temperature not more than 130° C. higher than said first temperature.

5. A process as defined by claim 4 wherein the regenerating step is incompletely conducted.

6. A process as defined by claim 1, further comprising regenerating adsorbent in said first adsorber zone with a greater frequency than adsorbent in said second adsorber zone.

7. In a process for the production of cyrogenic gases comprising compressing raw gas, cooling resultant compressed gas to condense substantially all impurities boiling above −120° C. in said compressed gas, and passing resultant condensate-freed gas through an adsorption zone to eliminate remaining impurities, the improvement in the adsorption step which comprises passing gas containng an adsorbable impurity, said adsorbable impurity having a normal boiling point below −120° C., through a first adsorber zone operating at a first temperature less than the critical temperature of nitrogen to remove a proportion of said adsorbable impurity; then cooling resultant purified gas; passing resultant cooled partially purified gas to a second adsorber zone operating at a second temperature to remove a further amount of said adsorbable impurity, said second absorber zone operating at a temperature lower than said first temperature; and withdrawing finally purified gas from said second adsorber zone.

8. A process as defined by claim 7 wherein said second temperature is at least 25° C. lower than said first temperature.

9. A process as defined by claim 7, further comprising the step of regenerating adsorbent in said first adsorber zone at a temperature not more than 130° C. higher than said first temperature.

10. A process as defined by claim 9 wherein the regenerating step is incompletely conducted.

11. A process as defined by claim 7 wherein adsorbent in said first adsorber zone is regenerated with a greater frequency than adsorbent in said second adsorber zone.

12. A process as defined by claim 1 wherein the proportion of impurities removed in said first adsorber zone is relatively large and the proportion removed in second adsorber zone is relatively small.

13. A process as defined by claim 7 wherein the proportion of impurities removed in said first adsorber zone is relatively large and the proportion removed in second adsorber zone is relatively small.

14. A process as defined by claim 1 wherein the regenerating temperature is not more than 90° C. higher than said first temperature.

15. A process as defined by claim 7 wherein the regenerating temperature is not more than 90° C. higher than said first temperature.

16. A process as defined by claim 1 wherein the purified gas has a normal boiling point below −230° C.

17. A process as defined by claim 7 wherein the purified gas has a normal boiling point below −230° C.

18. A process as defined by claim 1 wherein the concentration of impurities leaving the first adsorber zone is 50–500 parts per million.

19. A process as defined by claim 7 wherein the concentration of impurities leaving the first adsorber zone is 50–500 parts per million.

20. In a process for the production of hydrogen containing at least 1 adsorbable impurity selected from the group consisting of nitrogen, methane, carbon monoxide, and a mixture thereof, comprising compressing raw hydrogen, cooling resultant compressed hydrogen to condense substantially all impurities boiling above −120° C. in said compressed hydrogen, and passing resultant condensate-free hydrogen through an adsorption zone to eliminate said adsorbable impurity, the improvement in the adsorption step which comprises passing said hydrogen containing said adsorbable impurity through a first adsorber zone operating at 90° K. to remove a proportion of said adsorbable impurity; then passing resultant purified gas to a second adsorber zone operating at 35–45° K. to remove a further amount of said adsorbable impurity; and withdrawing finally purified gas from said second adsorber zone.

References Cited
UNITED STATES PATENTS

| | | | |
|---|---|---|---|
| 3,011,589 | 12/1961 | Meyer | 62—18 |
| 3,023,841 | 3/1962 | Milton et al. | 55—389 X |
| 3,126,266 | 3/1964 | Meisler | 62—23 X |
| 3,150,942 | 9/1964 | Vasan | 55—62 X |
| 3,172,748 | 3/1965 | Feinleib et al. | 55—389 |
| 3,226,197 | 12/1965 | Lewis | 62—33 X |

REUBEN FRIEDMAN, *Primary Examiner.*

J. ADEE, *Assistant Examiner.*